(No Model.)

J. S. ROGERS.
PROCESS OF AND APPARATUS FOR GENERATING ELECTRICITY.

No. 487,644. Patented Dec. 6, 1892.

WITNESSES:
Edward Wolff
William J. Miller

INVENTOR:
J. S. Rogers.
BY
Van Santvoord &
ATTORNEYS.

UNITED STATES PATENT OFFICE.

J. S. ROGERS, OF NEW YORK, N. Y.

PROCESS OF AND APPARATUS FOR GENERATING ELECTRICITY.

SPECIFICATION forming part of Letters Patent No. 487,644, dated December 6, 1892.

Application filed April 14, 1892. Serial No. 429,185. (No model.)

*To all whom it may concern:*

Be it known that I, J. S. ROGERS, a citizen of the United States, residing at New York, in the county and State of New York, have invented new and useful Improvements in Processes of and Apparatus for Generating Electricity, of which the following is a specification.

The object of my invention is to generate a continuous or practically continuous current of electricity by the uninterrupted process of deoxidizing and reoxidizing an electrolyte composed of the oxides, salts, or compounds of suitable elements—such, for instance, as the monoxide of lead—which when subjected to a high temperature will be deoxidized by the action of a combustible gas, such as hydrogen, and then reoxidized if exposed to an atmosphere of air or oxygen.

In carrying out my invention I use an apparatus which is illustrated in the accompanying drawings, in which—

Figure 1:
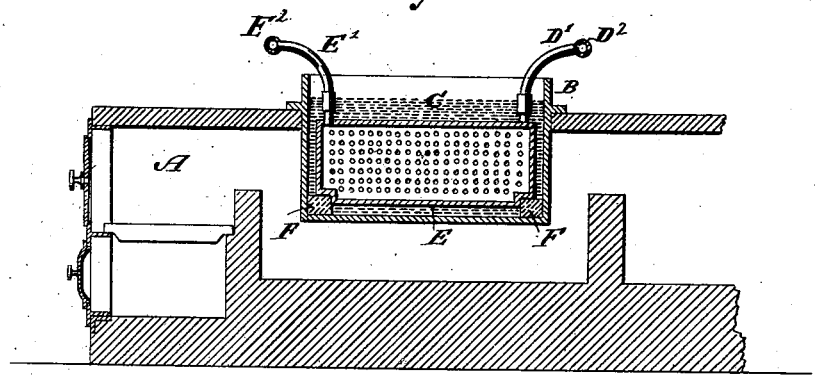
Figure 2:
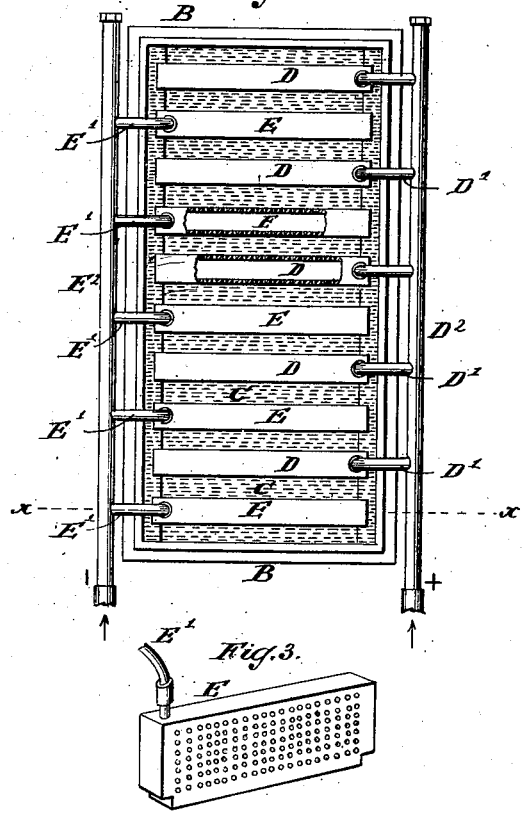
Figure 3:
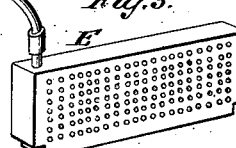

Figure 1 represents a transverse vertical section, the plane of section being indicated by the line $x$ $x$, Fig. 2. Fig. 2 is a plan or top view. Fig. 3 is a perspective view of one of the electrodes.

In the drawings, the letter A designates a suitable furnace, and B is a cell of iron into which is placed the electrolyte C.

D and E is a series of electrodes which rest upon fire-clay supports F F, so as to prevent a metallic contact between the electrodes and the cell. The electrodes D are connected by branch pipes D' with a main supply-pipe $D^2$, and the electrodes E are connected by branch pipes E' with a main supply-pipe $E^2$. The main supply-pipes $D^2$ $E^2$ also act as the poles of the battery, being electrically connected to the electrodes D E, respectively, by the branch pipes D' E'. The electrodes must be made of a good conductor of electricity, such as iron or copper, and they may be made in any suitable shape—such, for instance, as that shown in Fig. 3—that is to say, in the shape of a hollow rectangular vessel provided in its sides with a large number of small perforations.

The electrolyte, which is introduced into the cell B, must have the following properties: When exposed to a high temperature, it must be reduced to a liquid state. When it is brought in contact with a combustible gas while being in a liquid state, it must be capable of being deoxidized, and when the deoxidized substance in its liquid state is brought in contact with air or oxygen it must be capable of being reoxidized. These properties are found in various fusible oxides—such, for instance, as monoxide of lead—and I will now proceed to explain the action of my battery when the cell B is charged with monoxide of lead. By the heat of the furnace A the monoxide fuses and then a combustible deoxidizing gas—such as hydrogen or a hydrocarbon gas—is forced through the pipe $E^2$ and branch pipes E' into the electrodes E, and oxidizing gas—such as air or oxygen—is forced through the pipes $D^2$ and the branch pipe D' into the electrodes D. As the deoxidizing gas issues from the perforations in the sides of the electrodes E and comes in contact with the heated electrolyte (PbO) the latter becomes deoxidized and the metal (Pb) which remains is carried toward the electrodes D, where it meets the air or oxygen issuing through the perforations in the sides of said electrodes, so that said metal becomes reoxidized, and by these means an electric current is produced, as indicated by the signs $+$ and $-$ in Fig. 2. After operating the battery for five hours (more or less) I find that the electrodes and those portions of the supply-pipes $D^2$ which have been heated to a high temperature in the presence of air become oxidized to some extent, and in order to remedy this I change from time to time the supply of hydrogen to the pipe $D^2$ and the supply of oxygen to the pipe $E^2$, which will involve a corresponding change in the polarity of said pipes.

By using atmospheric air on one side of my battery and the hydrogenic gases produced by the action of steam upon incandescent coke or coal on the other side and monoxide of lead as the electrolyte I am enabled to produce electricity at a very low cost; but I do not wish to confine myself to the precise substances just named, since various different gases and different electrolytes may be used without departing from the spirit of my invention.

What I claim as new, and desire to secure by Letters Patent, is—

1. The process of generating electricity, which consists in exposing a fusible electrolyte capable of being deoxidized and reoxidized while in a state of fusion in the presence of suitable electrodes to a current of a deoxidizing gas injected in one direction and to a current of an oxidizing gas injected in the opposite direction, substantially as described.

2. The process of generating electricity, which consists in exposing an electrolyte composed of a fusible metallic oxide while in a state of fusion in the presence of electrodes made of a metal the melting-point of which is higher than that of the electrolyte to a current of deoxidizing gas, such as hydrogen or a hydrocarbon gas, injected in one direction and to a current of an oxidizing gas, such as atmospheric air or oxygen, injected in the opposite direction, substantially as described.

3. An electric battery composed of a cell B, containing a suitable electrolyte, two hollow foraminous electrodes D E, a gas-supply pipe $D^2$, made to connect electrically with the electrode D, a gas-supply pipe $E^2$, made to connect electrically with the electrode E, and a source of heat, substantially as described.

4. An electric battery composed of a furnace H, a cell B, containing a suitable electrolyte, and two or more electrodes D E and gas-supply pipes $D^2$ $E^2$, one being connected electrically to the electrode or electrodes D and the other to the electrode or electrodes E, substantially as described.

In testimony whereof I have hereunto set my hand in the presence of two subscribing witnesses.

J. S. ROGERS.

Witnesses:
 WM. C. HAUFF,
 E. F. KASTENHUBER.